June 2, 1936.   F. F. VICTORIA   2,042,641
PULP AND LIQUID PUMP
Filed Nov. 13, 1934   2 Sheets-Sheet 2
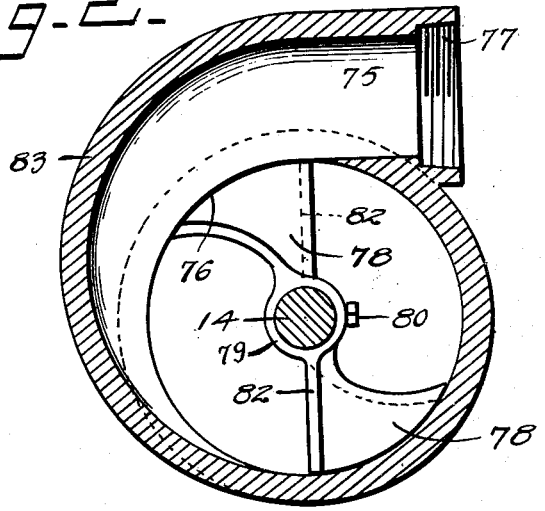
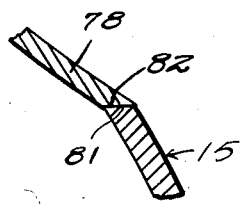
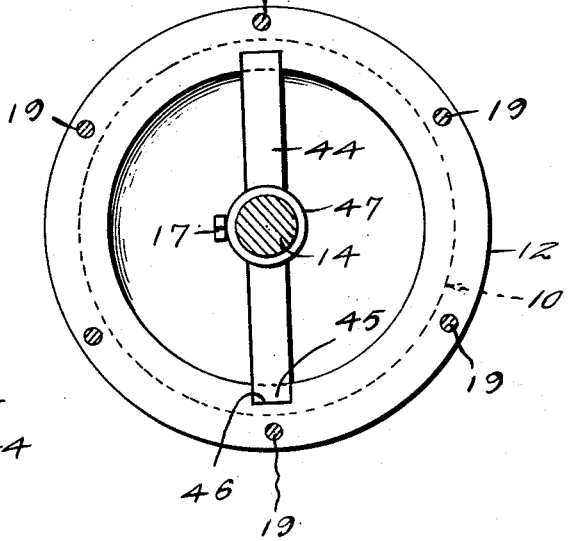
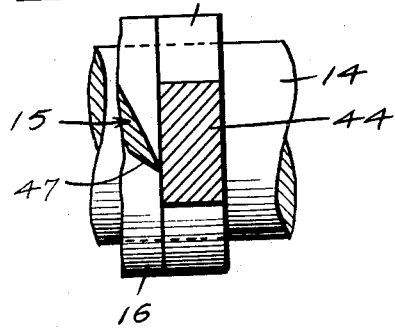
Inventor
F. F. Victoria
By Watson E. Coleman
Attorney Patented June 2, 1936

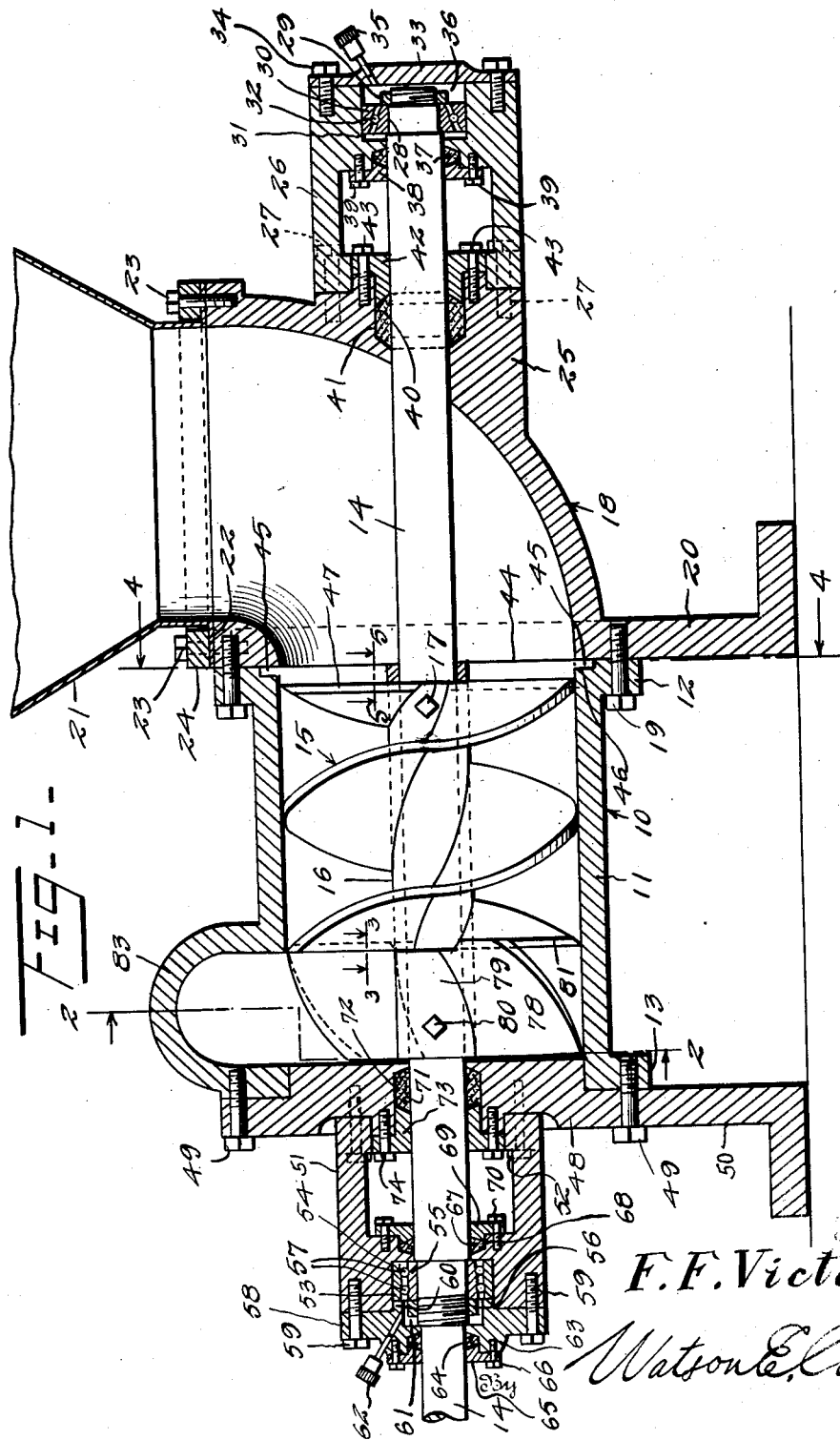

2,042,641

UNITED STATES PATENT OFFICE 2,042,641

PULP AND LIQUID PUMP

Frank F. Victoria, Upland, Calif.

Application November 13, 1934, Serial No. 752,879

2 Claims. (Cl. 103—89)

This invention relates to pumps and more particularly to a combined liquid and pulp pump adapted particularly for use in connection with fruit crushing or pressing means.

An object of this invention is to provide a pump which is adapted to be disposed beneath a fruit crushing means such as a press or the like for use in crushing grapes or other fermentitious fruits so that the crushed material may be drawn from the crushing or pressing means in a continuous manner and then deposited into receptacles such as vats or the like where the crushed fruit may ferment.

A further object of this invention is to provide in a device of this kind means whereby the uncrushed portions of the fruit such as stems or the like may be cut as they enter the conveyor so that the conveyor will not clog up on account of the uncrushed portions of the fruit.

A still further object of this invention is to provide in a device of this kind means for moving the material away from the hopper disposed beneath the pressing or crushing means and then forcing the material into pipes through which the material passes to vats or the like.

A further object of this invention is to provide in a device of this kind means whereby the material may be moved away from the press at a relatively rapid rate so that there will not be any clogging of the material.

Still another object of this invention is to provide a combined conveying and material forcing means mounted on a single shaft so that the material may initially be moved away from the press and then forced away from the conveyor.

The above and various other objects and advantages of this invention will in part be described and in part be understood from the following detailed description of the present preferred embodiment, the same being illustrated in the accompanying drawings wherein:

Figure 1 is a longitudinal section taken substantially through the center of a device constructed according to the preferred embodiment of this invention.

Figure 2 is a sectional view taken on the line 2—2 of Figure 1.

Figure 3 is a fragmentary sectional view taken on the line 3—3 of Figure 1.

Figure 4 is a sectional view taken on the line 4—4 of Figure 1.

Figure 5 is an enlarged sectional view taken on the line 5—5 of Figure 1.

Referring to the drawings wherein like numerals of reference designate corresponding parts throughout the several views, the numeral 10 designates generally a housing which is adapted to be disposed beneath a fruit crushing machine and this housing comprises a cylinder 11 provided at each end with flanges 12 and 13. The cylinder 11 has a drive shaft 14 disposed concentrically thereof and mounted on this drive shaft 14 is a spiral conveyor generally designated as 15, having a hub 16 mounted on the shaft 14. The hub 16 is secured against circumferential and longitudinal movement by means of set screws 17 or the like. One end of the drive shaft 14 is adapted to be connected to a source of power supply such as a motor or other power means. An intake member, generally designated as 18, is disposed on one end of the housing 10, the cylinder 11 being secured thereto by means of bolts 19 or the like.

A supporting means 20 extending below the member 18 forms one means for supporting the housing 10 in a substantially horizontal position beneath a fruit crusher or press. This intake member 18 is constructed in the form of an elbow which opens upwardly and a hopper 21 having a flange 22 is secured as by bolts 23 and an annulus 24 to the top of the intake member 18. This hopper 21 may be of any suitable size and have its upper end portion so formed as to loosely engage beneath the discharge portion of the crusher. One end of the shaft 14 is journaled in the intake member 18 by means of a bearing structure including a boss 25 carried by the intake member 18 in alinement with the shaft 14 and this boss 25 has a hollow member 26 secured as by bolts 27 disposed loosely about the end of the shaft 14.

The end of the shaft 14 disposed in the bearing housing 26 has a race member 28 secured as by a nut 29 which is threaded onto the end of the shaft 14 and an outer race 30 is disposed in a recess 31 provided in the outer portion of the bearing housing 26. Anti-friction members 32 are disposed between the two race members 28 and 30 so as to prevent endwise thrust movement of the shaft 14 while at the same time mounting the shaft 14 for free turning movement. A plate 33 is secured as by bolts 34 to the outer end of the bearing housing 26 and a grease cup 35 is carried by the plate 33, which plate has a lubricating channel therethrough so that a lubricant may be forced into the bearing chamber 36 within the housing 26. A gasket 37 is disposed about the shaft 14 within the bearing housing 26 and a gland member 38 presses against this gasket 37, being held in tight engagement therewith by means of bolts 39 or the like. In this manner, any lubricant within the lubricant chamber 36 will not pass longitudinally of the shaft 14. A second packing or gasket member 40 is disposed about the shaft 14 in a recess 41 provided in the boss 25 and is held in engagement with the shaft 14 by means of a gland 42 adjusted by means of bolts 43.

Through the bearing means hereinbefore described, one end of the shaft 14 is journaled in the intake member 18 and the shaft permitted to freely rotate relative to the intake member 18 and the housing 10 while any lubricant used for the thrust bearing will not be permitted to flow along the shaft 14 into the intake member 18 and the second gland and packing member will prevent any juices from the housing and intake member from commingling with the lubricant in the lubricant chamber.

A cutter bar 44 having reduced end portions 45 mounted in recesses 46 extends diametrically across the intake end of the cylinder 11 and is provided centrally with an eye or annular portion 47 loosely engaging about the shaft 14. The intake end of the conveyor 15 has a cutting edge portion 47 adapted to closely engage the cutter bar 44 so that any fruit stems or the like which may enter the housing 10 will be cut off and in this manner the intake end of the conveyor 15 will not become clogged as it is rotating within the cylinder 11. The opposite or rear end of the housing 10 has a plate 48 secured thereto as by bolts 49 and this plate 48 has a supporting or base structure 50 coacting with the base structure 20 to support the housing 10 on a plane surface.

A second bearing housing 51 is secured to the rear or opposite end of the housing 10, being secured as by bolts 52 to the outer side of the plate 48. The bearing housing 51 has an outer race member 53 disposed in a recess 54 and an inner race member 55 is secured to the shaft 14 as by a nut 56 which is threaded onto the periphery of the shaft 14. In the present instance, the anti-friction bearing including the outer and inner race members 53 and 55, respectively, are of a multiple construction including at least two series of balls or rollers 57. Through the use of the multiple bearing structure hereinbefore described, the shaft 14 is prevented from having endwise movement in either direction. The outer race member 53 is held within the recess 54 as by a plate or annulus 58 secured as by bolts 59 to the outer end of the housing 51.

The plate 58 has an annular extension 60 extending into the annular recess 54 and engaging against the outer side of the race member 53. The plate 58 has a lubricant chamber 61 engaging about the shaft 14 and a grease cup 62 is attached to the hub portion 63 of the plate 58 and communicates with the lubricant chamber 61.

An outer gasket 64 is disposed in the hub 63 and a gland 65 tightened as by bolts 66 holds the gasket or packing 64 in a sealed position about the shaft 14 and within the hub 63. An intermediate gasket 67 is disposed in a recess 68 provided in the bearing member 51 inwardly of the anti-friction bearing comprising the race members 53 and 55 and the anti-friction elements 57. A gland 69 engages against the inner end of the packing or sealing member 67, being tightened as by bolts 70.

An inner packing member 71 is mounted in a recess 72 provided in the plate 48, being secured in a sealing position about the shaft 14 as by a gland 73 which is tightened by bolts 74. The two bearing members 26 and 51 rotatably support the shaft 14 relaitve to the housing 10 and the packing members 40 and 71 prevent any liquids in the housing 10 from flowing out of the housing along the shaft 14.

The housing 10 at its discharge end has a discharge port 75 communicating as by a segmental slot 76 with the interior of the cylinder 11. The discharge portion of the housing 10 has a threaded boss 77 to which a pipe or the like may be connected so that the material forced out of the cylinder 11 may be conveyed to suitable vats or receptacles.

In order to provide a means whereby the material moved longitudinally of the cylinder 11 may be quickly forced out therefrom, I have provided an impeller including a pair of blades 78 integral with a hub portion 79 secured as by a set screw 80 to the shaft 14. Preferably the blades 78 have a deeper pitch than the pitch of the conveyor 15 so that the material in the cylinder 11 will be forced through the slot or discharge port 76. The rear or discharge end of the conveyor 15 is preferably beveled as at 81, and the confronting edge of the impeller or discharging member comprising the blades 78 and the hub 79 has a straight beveled edge 82 adapted to overlap the beveled edge 81 of the conveyor 15. In this manner, a substantially continuous surface will be provided over which the material in the cylinder 11 may pass while at the same time the configuration of the blades 78 is such as to force the material out of the cylinder 11. The impeller blades 78 and the eccentrically disposed portion 83 of the housing 10 comprises a pump for withdrawing the material from the cylinder 11 and at the same time forcing this material through pipes or the like which may be attached to the threaded boss 77.

In the use of this device, the material which is crushed or pressed is discharged into the hopper 21 and will gravitatingly flow downwardly into the intake member 18 and then will contact with the forward end of the conveyor 15. At this point, the material is forcibly moved through the cylinder 11 and any stems or other material such as skins or the like which may be engaged about the forward ends of the impeller will be cut off by engagement of the cutting portion 47 of the impeller blades with the fixed cutter member 44. Preferably the shaft 14 is rotated at a relatively rapid rate so that the pump blades 78 will forcibly throw the liquid and the pulp out of the pump housing 83 and force the material through pipes or the like which may be attached to the threaded boss 77. The use of the pump structure hereinbefore described will permit the more rapid and convenient handling of the pulp and the liquid removed from the pulp by a pressing or crushing means.

What is claimed is:—

1. A pump as set forth, comprising a casing, an intake member at one end of the casing, a drive shaft journaled in the casing, a spiral conveyor secured to said shaft within the casing, a cutter bar extending diametrically of the casing and having reduced opposite end portions, said casing having recesses to receive said reduced end portions of the cutter bar, said bar at the central portion thereof having an eye loosely engaging about the shaft and said conveyor having keen portions at the end confronting said cutter bar whereby to cut material engaging the intake end of the conveyor to prevent clogging thereof.

2. A pump as set forth, comprising a casing, an intake member at one end of the casing, a drive shaft journaled in the casing, a spiral conveyor secured to said shaft within the casing, a straight cutter bar extending diametrically across the casing, said casing having opposed recesses to receive the opposite end portions of the bar to hold the bar against rotation, an eye at the central portion of the bar loosely engaging about the shaft, said conveyor having keen portions at the end confronting said cutter bar whereby to cut material engaging the intake end of the conveyor to prevent clogging thereof.

FRANK F. VICTORIA.